United States Patent [19]

Poux

[11] Patent Number: 4,713,666

[45] Date of Patent: Dec. 15, 1987

[54] METHOD OF PROCESSING THE SUM AND DIFFERENCE SIGNALS OF A RADAR OF THE MONOPULSE TYPE FOR ESTIMATING THE PARASITE PHASE INTRODUCED BETWEEN THESE SIGNALS BY THE ULTRAHIGH FREQUENCY FORMATION CIRCUITS OF THE SUM AND DIFFERENCE CHANNELS

[75] Inventor: Jean P. Poux, Orlando, Fla.

[73] Assignee: Thomson-CSF, Paris, France

[21] Appl. No.: 17,627

[22] Filed: Feb. 24, 1987

[30] Foreign Application Priority Data

Feb. 28, 1986 [FR] France .................. 86 02877

[51] Int. Cl.$^4$ .............................................. G01S 13/44
[52] U.S. Cl. .................................... 342/152; 342/194; 342/188
[58] Field of Search ............... 342/80, 149, 152, 188, 342/194, 151

[56] References Cited

U.S. PATENT DOCUMENTS

| | | | |
|---|---|---|---|
| 3,794,998 | 2/1974 | Pearson, Jr. et al. | 342/151 |
| 4,368,468 | 1/1983 | Lisle et al. | 342/151 |
| 4,568,940 | 2/1986 | Diamond | 342/149 |
| 4,646,095 | 2/1987 | Kanter | 342/149 |
| 4,656,480 | 4/1987 | Allezard et al. | 342/151 |

FOREIGN PATENT DOCUMENTS 0038734 10/1981 European Pat. Off. .

Primary Examiner—T. H. Tubbesing
Assistant Examiner—Bernarr Earl Gregory
Attorney, Agent, or Firm—Marmorek, Guttman & Rubenstein

[57] ABSTRACT

The method of the invention, applied for example to estimating the parasite phase $\phi_a$ between the azimuth sum $\Sigma_a$ and difference $\Delta_a$ channels, consists in calculating the expressions $S=\Sigma_a \cdot \Sigma_e^*$ and $D=\Delta_a \cdot \Sigma_e^*$ for different successive measurements made by the radar, then in calculating the expressions $[S_{(k+1)}-S_{(k-1)}]\cdot D^*(k)$ for different successive times $k-1, k, k+1$ and in averaging the result of this expression or different times k, it being understood that the radar antenna sweeps in azimuth and that the radar wave emitted is polarized circularly, the single pulse azimuth and elevation receivers receiving respectively only one of the circular polarization types: right hand or left hand.

4 Claims, 5 Drawing Figures

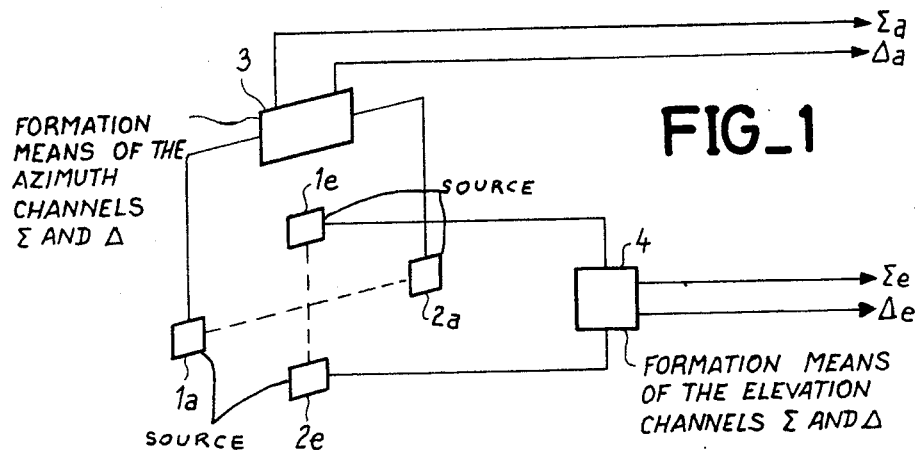
FIG_1
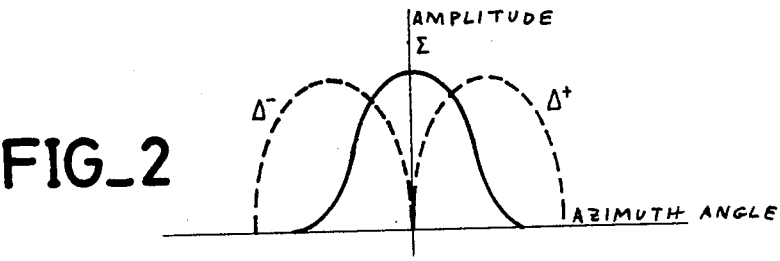
FIG_2
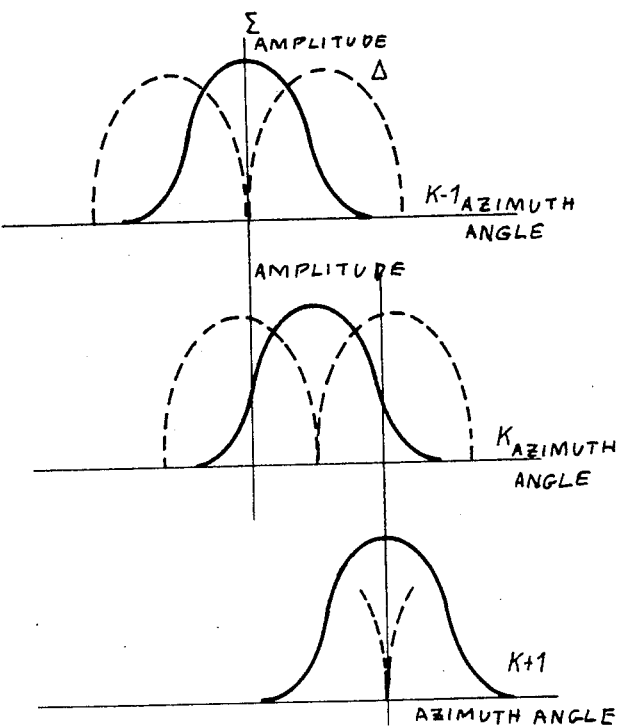
FIG_3

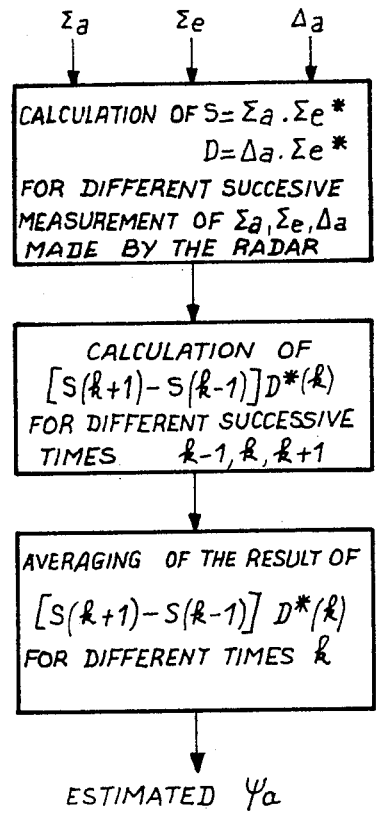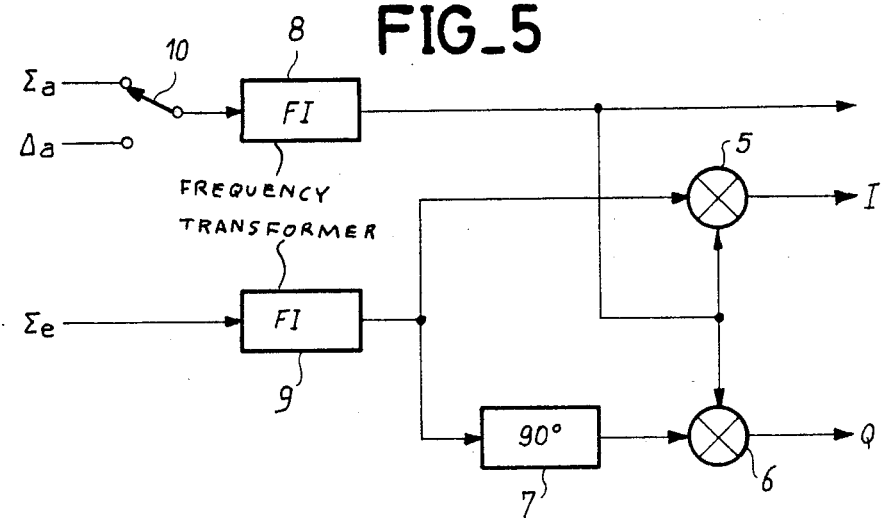

METHOD OF PROCESSING THE SUM AND DIFFERENCE SIGNALS OF A RADAR OF THE MONOPULSE TYPE FOR ESTIMATING THE PARASITE PHASE INTRODUCED BETWEEN THESE SIGNALS BY THE ULTRAHIGH FREQUENCY FORMATION CIRCUITS OF THE SUM AND DIFFERENCE CHANNELS

BACKGROUND OF THE INVENTION

1. Field of the Invention

The present invention relates generally to the field of radar and concerns more particularly a method of processing the signals of a radar of the monopulse type, for estimating a parasite phase introduced between these signals by the ultrahigh frequency formation circuits of the sum and difference channels.

2. Description of the Prior Art

It is known that with a radar of the monopulse type the angular location of targets may be obtained by processing the different signals received simultaneously from these targets and corresponding to different beam directivities.

Thus, as shown very schematically in FIG. 1, by providing two sources respectively in the azimuth plane (1a, 2a) and in the elevational plane (1e, 2e), at reception there are available for each of these two planes two signals of which the sum $\Sigma$ and the difference $\Delta$ may be formed by ultrahigh frequency means (3, 4), which is tantamount to having an antenna with a beam corresponding to the $\Sigma$ channel and another beam corresponding to the $\Delta$ channel, and thus allows angular location of the targets to be obtained simply.

It is also known that, with the reradiation of a target being a sum of the waves reflected by each of the reflecting elements which form it, the signals S and D received respectively in the sum and difference channels, in azimuth or in elevation, have as complex representation:

$$S = \sum_i s(\theta_i) a_i e^{j(\phi_i - w\frac{2d_i}{c})}$$

$$D = e^{-j\Psi} \sum_i d(\theta_i) a_i e^{j(\phi_i - w\frac{2d_i}{c})}$$

with:
- $s(\theta_i)$: gain of the sum channel at the angle $\theta_i$;
- $d(\theta_i)$: gain of the difference channel at the angle $\theta_i$;
- $a_i$: amplitude relative to the ith reflector;
- $\phi_i$: phase shift introduced by the ith reflector;
- $d_i$: distance between the radar and the ith reflector;
- $\Psi$: parasite phase introduced between the $\Sigma$ and $\Delta$ channels by the ultrahigh frequency formation circuits of the sum and difference channels.

It is also known that, in the particular case of the elevational plane, the parasite phase $\Psi$ between the sum and difference channels may be evaluated in the following way:

let $$P = S \times D^*$$

$$= e^{j\Psi} \left( \sum_i s(\theta_i) d(\theta_i) a_i^2 + \sum_{\substack{i,j \\ i \neq j}} a_i a_j s(\theta_i) d(\theta_j) e^{j[\phi_{ij} - w\frac{2d_{ij}}{c}]} \right)$$

where D* designates the complex conjugate quantity of D, and where:

$$\begin{cases} \phi_{ij} = \phi_i - \phi_j \\ d_{ij} = d_i - d_j \end{cases}$$

If we calculate the mean value of P over different distances divisions of the radar, the phase $$\phi_{ij} - w\frac{2d_{ij}}{c}$$

being considered as random, we have:

$$E(P) = e^{j\Psi} E\left[ \sum_i s(\theta_i) d(\theta_i) a_i^2 \right] = e^{j\Psi} E(a)$$

where E designates the expectation operator.

The term "a" is real, but is a priori of unknown sign because of the factors $d(\theta_i)$ which may be positive or negative. In fact, referring to FIG. 2 which shows the trend of the sum and difference diagrams, $\Sigma$ and $\Delta$, in the azimuth plane or in the elevational plane, the sum diagram has the maximum in the direction of the axis of the antenna, whereas the difference $\Delta$ diagram has on the contrary a minimum in this direction and is, on each side of this direction, either in phase ($\Delta+$) or in phase opposition ($\Delta-$) with $\Sigma$.

By averaging P, we can then a priori only estimate the phase $\Psi$ to with in the sign.

Now, it so happens that in the elevational plane this ambiguity of sign may be relatively simply removed for the sign of $d(\theta_i)$ is always related to the rank of the range bin considered being negative for the closest range bins and positive for the furthest range bins. By averaging P over the different range bins, an estimation of the phase $\Psi$ is obtained without ambiguity of sign after correction of the sign as a function of the considered range bin.

SUMMARY OF THE INVENTION

The present invention relates to a method of estimating the parasite phase $\Psi$ for resolving these ambiguities of sign also in the azimuth plane, and whose principle is also applicable to the estimation of the parasite phase $\Psi$ in the elevational plane, as well as to the estimation of the differential phase $\delta\phi$ between the azimuth and elevational planes, this latter possibility moreover forming, as will be seen further on, the basis of another method of estimating the parasite phase in the azimuth plane.

According to the invention, the method of processing the sum $\Sigma$ and difference $\Delta$ signals, in azimuth: $\Sigma_a$, $\Delta_a$, and in elevation: $\Sigma_e$, $\Delta_e$, of a radar of the monopulse type, for estimating the parasite phase $\Psi$ introduced between these signals by the ultrahigh frequency formation circuits of the sum and difference channels consists:

in calculating for each measurement made by the radar the expressions S and D, with $$\begin{cases} S = \Sigma_a \cdot \Sigma_e^* \\ D = \Delta_e \cdot \Sigma_a^* \end{cases}$$

or $$\begin{cases} S = \Sigma_e \cdot \Sigma_a^* \\ D = \Delta_e \cdot \Sigma_a^* \end{cases}$$

or $$\begin{cases} S = \Sigma_a \cdot \Sigma_e^* \\ D = \Delta_a \cdot \Delta_e^* \end{cases}$$

(where the symbol * designates the complex conjugate quantity), depending on whether it is desired to estimate the parasite phase $\Psi_a$ in azimuth in the first case, or the parasite phase $\Psi_e$ in elevation in the second case or the differential parasite phase $\delta\Psi = \Psi_a - \Psi_e$ in the third case, it being understood that the radar wave emitted is polarized circularly and that the azimuth and elevation monopulse receivers only receive respectively one of the circular polarization types: right or left, in calculating the expression $$[S(k+1) - S(k-1)]D^*(k)$$

it being understood that the radar antenna sweeps during time in azimuth in the first case and in the third case, in elevation in the second case and that $k-1$, $k$, $k+1$ designate three successive times such that the difference $s_{(k+1)}(\theta) - s_{(k-1)}(\theta)$ is of the same sign as $d_{(k)}(\theta)$, where $s_{(k+1)}(\theta)$ and $s_{(k-1)}(\theta)$ designate respectively the gain of the sum channel at the angle $\theta$, in azimuth in the first case and in the third case, in elevation in the second case, respectively at times $k+1$ and $k-1$, and where $d_{(k)}(\theta)$ designates the gain of the difference channel at the angle $\theta$ at time k, in azimuth in the first and in the third cases, in elevation in the second case;

in calculating the mean value of the result of the preceding expression for several successive times corresponding to several measurements successively made by the radar, which allows an expression to be obtained of the form $e^{j\Psi}\cdot a$, where $\Psi$ is the parasite phase sought and "a" a real number of given absolute value and sign.

BRIEF DESCRIPTION OF THE DRAWINGS

Other objects and features of the present invention will appear more clearly from the following description of embodiments made with reference to the accompanying drawings in which:

FIG. 1 shows schematically the formation of the sum and difference channels in azimuth and in elevation in a radar of monopulse type;

FIG. 2 shows the form of the sum and difference diagrams of a monopulse radar in the azimuth plane or in the elevational plane;

FIG. 3 illustrates the sweeping of the radar antenna, according to the invention;

FIG. 4 is a block diagram of the processing carried out in accordance with the invention; and FIG. 5 is a diagram of the product detector used in the processing according to the invention.

DESCRIPTION OF THE PREFERRED EMBODIMENT

The invention is used in a radar system with circularly polarized coherent or non coherent transmission, capable of receiving and discriminating the right hand circular polarization and left hand circular polarization. For the sake of clarity in what follows, the azimuth channels will receive the right hand polarization whereas the elevational channels receive the left hand polarization; the reverse would also be possible.

Thus, referring to an absolute hypothetical phase the sum signals $\Sigma_a$ and $\Sigma_e$, respectively in azimuth and in elevation, and the difference signals $\Delta_a$ and $\Delta_e$, respectively in azimuth and in elevation, are written:

$$\Sigma_a = e^{-j\Psi_1} \sum_i s_a(\theta_{Di}) a_{Di} e^{j(\phi_{Di} - 2\pi f \frac{2dDi}{c} + \phi_t)}$$

$$\Sigma_e = e^{-j\Psi_2} \sum_j s_e(\theta_{Gj}) a_{Gj} e^{j(\phi_{Gj} - 2\pi f \frac{2dGi}{c} + \phi_t)}$$

$$\Delta_a = e^{-j\Psi_3} \sum_i d_a(\theta_{Di}) a_{Di} e^{j(\phi_{Di} - 2\pi f \frac{2dDi}{c} + \phi_t)}$$

$$\Delta_e = e^{-j\Psi_4} \sum_j d_e(\theta_{Gj}) a_{Gj} e^{j(\phi_{Gj} - 2\pi f \frac{2dGj}{c} + \phi_t)}$$

where the indices D and G designate the channels receiving the right hand and left hand polarizations, and the indices a and e the angular azimuth and elevational dimensions, and where $\phi_t$ designates the non coherent phase component which changes from pulse to pulse.

From the sum and difference signals $\Sigma_a$, $\Sigma_e$, $\Delta_a$, $\Delta_e$, the following expressions are calculated.

$$S = \Sigma_a \cdot \Sigma_e^*$$

$$D = \Delta_a \cdot \Sigma_e^*$$

With a unit of time fixed sufficiently small for the phase shift between channels to be considered as constant, we have at a time k:

$$S(k) = e^{-j(\Psi_1 - \Psi_2)} \sum_{l,m} s_a(\theta_{Dl}) s_e(\theta_{Gm}) a_{Dl} a_{Gm} \cdot$$

$$e^{j(\phi_{Dl} - \phi_{Gm} - 2\pi f_2 \frac{(dDl - dGm)}{c})}$$

$$D(k) = e^{-j(\Psi_3 - \Psi_2)} \sum_{i,j} d_a(\theta_{Di}) s_e(\theta_{Gj}) a_{Di} a_{Gj} \cdot$$

$$e^{j(\phi_{Di} - \phi_{Gj} - 2\pi f_2 \frac{(dDj - dGj)}{c})}$$

It will be noted that calculation of the expressions S and D allows, among other things, to be free of the non coherent phase component $\phi_t$.

We then calculate the expression:

$$[S(k+1) - S(k-1)]D^*(k)$$

where $k-1$, $k$ and $k+1$ designate three successive times.

We have:

$$[S(k+1) - S(k-1)]D^*(k) = e^{-j(\Psi_1-\Psi_3)} \left\{ \sum_{i,j} [s_{a(k+1)}(\theta_{Di}) - s_{a(k-1)}(\theta_{Di})]d_{a(k)}(\theta_{Di}) \cdot s^2_e(\theta_{Gj})a^2_{Di}a^2_{Gj} + \sum_{\substack{i \neq 1 \\ ou \\ j \neq m}} [s_{a(k+1)}(\theta_{Di}) - \right.$$

$$\left. s_{a(k-1)}(\theta_{Di})]d_{a(k)}(\theta_{Di})s_e(\theta_{Gj})s_e(\theta_{Gm}) \cdot a_{Di}a_{Gj}a_{Dl}a_{Gm}e^{j[\phi_{Dl}-\phi_{Gm}-2\pi f_2 \frac{(d_{Dl}-d_{Gm})}{c} -\phi_{Di}-\phi_{Gj}-2\pi f_2 \frac{(d_{Gj}-d_{Dl})}{c}]} \right\} =$$

$$e^{-j(\Psi_1-\Psi_3)}\left(a + \sum_n b_n e^{j\phi_n}\right) \text{ with: } a = \sum_{i,j}[s_{a(k+1)}(\theta_{Di}) - s_{a(k-1)}(\theta_{Di})]d_{a(k)}(\theta_{Di})s^2_e(\theta_{Gj})a^2_{Di}a^2_{Gj}$$

In the expression $$\sum_n b_n e^{j\phi_n},$$

the factors $b_n$ are assigned with a phase term $\phi_n$ which, since it may be considered as random, will disappear by averaging the expression: $[S(k+1)-S(k-1)]D^*(k)$ over several successive measurements of $\Sigma_a$, $\Delta_a$, $\Sigma_e$, $\Delta_e$ made by the radar and corresponding to several successive times k.

The notion of measurements made by the radar relates to the notion of range bins and pulses. For a given range bin, the averaging is carried out over several successive pulses, and averaging is then carried out over several distance divisions. Because of the double polarization. the factors to which such a phase term has not been assigned are limited to the expression "a" for which we have the equality i=l and j=m. All the other cases (such as i=j or m=l) are in fact excluded for they would correspond to individual reflectors which would reflect the two types of polarization: right hand and left hand, that is to say which would be both of the dihedron type (even number of successive reflections) and of the trihedral type (uneven number of successive reflections).

The invention allows then any angular information between the signals received to be kept, while eliminating the non coherence of the transmission, by referencing them to the response to the same pulse of different reflectors. This is achieved through the combination of the calculation of expressions S and D and the double polarization.

During the preceding development, the important assumption was made that between times $k-1$ and $k+1$ the angles of elevation $\theta_e$ (in this case $\theta_G$ since we are considering in this example the case where the azimuth channels receive the right hand polarization whereas the elevational channels receive the left hand polarization) are invariable, which allows the common factorization in the expression "a". This assumption is reasonable in the case of a fixed radar or of an airborne radar if the time unit is sufficiently small so that advance of the platform does not change the geometry of the system.

The invention is moreover used in an azimuth sweep radar system, the rotational speed of the antenna (in azimuth) being fixed at a value such that the lobes $\Delta-$ and $\Delta+$ at time k coincide respectively with the lobe $\Sigma$ at time $k-1$ and with the lobe $\Sigma$ at time $k+1$, as shown in FIG. 3.

Under these conditions, the product $$[s_{a(k+1)}(\theta_{Di})-s_{a(k-1)}(\theta_{Di})]d_{a(k)}(\theta_{Di})$$

is positive for any elementary reflector "i". In fact, if we consider for example an elementary reflector which is at time k on lobe $\Delta+$, we then have $d_{a(k)}$ which is positive, $s_{a(k+1)}$ which is also positive and $s_{a(k-1)}$ which is very small. The product is therefore positive; it would be the same for an elementary reflector which at time k would be on lobe $\Delta-$.

The azimuth speed of rotation of the antenna is not critical and could be chosen differently. The proposed choice seems however optimum in that it gives the largest values of the difference $(s_{a(k+1)}-S_{a(k-1)})$.

The factor "a" is therefore written as the sum of a large number of positive definites. On the contrary the factors $b_n$ are assigned with a phase term $\phi_n$ which may be considered as random.

Examination of several successive measurements of $[S(k+1)-S(k-1)]D^*(k)$, by averaging, allows the phase correction $\hat{\Psi}_1-\hat{\Psi}_3$ to be estimated whose variance will vary inversely with the number of measurements made, this number of measurements being fixed a priori or adapted to the desired accuracy by software.

Adaptation of the repetition period of the measurements made by the radar (coresponding to the notion of range bins and pulses) and of the repetition period of times k, that is to say the sweeping speed of the antenna, may be made in different ways, for example by suitably choosing the repetition period of the pulses or else by carrying out post integration over several pulses.

In FIG. 5 a diagram has been shown of the product detector used in the processing carried out in accordance with the invention for estimating the parasite phase between the sum and difference channels in azimuth.

The signals $\Sigma_a$, $\Delta_a$ and $\Sigma_e$ are applied to the input of this product detector which calculates the expressions:

$$S = \Sigma_a \cdot \Sigma_e^*$$

$$D = \Delta_a \cdot \Delta_e^*$$

by means of two mixers 5 and 6 one of which receives on the one hand the signal $\Sigma_e$ and on the other hand either the signal $\Sigma_a$, or the signal $\Delta_a$, and the other of which receives on the one hand the signal $\Sigma_a$ phase shifted by 90° by means of a phase shifter 7 and, on the other hand, either the signal $\Sigma_a$ or the signal $\Delta_a$. The signals $\Sigma_a \cdot \Delta_a$ and $\Sigma_e$ are further transformed into medium frequency signals by means of frequency change stages 8 and 9.

It should be noted that S and D are not used at the same times, since only the product $[S(k+1)-S(k-1)]D^*(k)$ is important. It is then possible to use only a single product detector, addressed successively through a switch 10 by channels $\Sigma_a$ and $\Sigma_c$, then $\Delta_a$ and $\Sigma_c$.

The magnitudes S and D are complex magnitudes which may be written in the form $I+jQ$ where I and Q designate respectively their real part and their imaginary part; magnitudes I and Q are obtained at two outputs of the product detector.

The other steps of the method may be achieved using adapted software.

In the foregoing, the invention has been described for estimating the parasite phase between the sum and difference channels in azimuth. The principle of the invention is nevertheless applicable to estimating the parasite phase between the sum and difference channels in elevation.

In this case, the following expressions would be calculated:

$$S = \Sigma_e \cdot \Sigma_a^*$$

$$D = \Delta_e \cdot \Sigma_a^*$$

The constraint concerning the sweep would then become a constraint concerning the elevational sweep, and the assumption that between times $k-1$, $k$ and $k+1$ the azimuth angles are invariable would also have to be made.

As will now be seen the principle of the invention is also applicable to estimating the differential parasite phase $\Psi_a - \Psi_e$, where $\Psi_a$ and $\Psi_e$ designate respectively the parasite phase in azimuth and in elevation. Estimation of this differential parasite phase may be interesting for the following reasons.

In the case more especially of a radar carried by a missile whose supersonic speed decreases during flight to subsonic values, the high temperature differences between the beginning and the end of the mission cause a variation of the azimuth and elevation parasite phases.

Now, the above mentioned antenna sweep constraints mean that estimation of a phase correcting factor is not possible during the whole period of use and processing of the radar.

Starting from the fact that the four receivers (two in azimuth and two in elevation) are physically close to each other and thermally interdependent, so that the variations of $\Psi_a$ and $\Psi_e$ will be similar, it is then sufficient to evaluate $\Psi_a$ and $\Psi_e$ during a so called calibration phase (previous to any operation in the search or tracking mode) and to calculate the difference $\Psi_a - \Psi_e$ which will remain constant during the whole flight time. In the tracking phase, it is still possible, as recalled in the introduction, to calculate $\Psi_e$ by a method of evaluation which offers no antenna position or frequency constraint. It is then possible to deduce $\Psi_a$ therefrom.

However, a successive evaluation of $\Psi_a$ and $\Psi_e$ during the calibration phase risks inducing an error in $\Psi_a - \Psi_e$ as for as the temperature may have changed between the two evaluations. Moreover, the calibration phase lasts a considerable time with respect to the total time of the mission of a short range missile.

The method of estimating the parasite phase of the invention allows the differential phase $\Psi_a - \Psi_e$ to be calculated directly without passing through the successive calculations of $\Psi_a$ and $\Psi_e$, which removes the above mentioned risk of error.

This method will now be described applied to estimating the differential phase $\Psi_a - \Psi_e$. As before, the signals received by the four angle error measurement channels are written:

$$\Sigma_a = e^{-j\Psi_1} \sum_i s_a(\theta_{Di}) a_{Di} e^{j(\phi_{Di} - 2\pi f \frac{2d_{Di}}{c} + \phi_t)}$$

$$\Sigma_e = e^{-j\Psi_2} \sum_j s_e(\theta_{Gj}) a_{Gj} e^{j(\phi_{Gj} - 2\pi f \frac{2d_{Gj}}{c} + \phi_t)}$$

$$\Delta_a = e^{-j\Psi_3} \sum_i d_a(\theta_{Di}) a_{Di} e^{j(\phi_{Di} - 2\pi f \frac{2d_{Di}}{c} + \phi_t)}$$

$$\Delta_e = e^{-j\Psi_4} \sum_j d_e(\theta_{Gj}) a_{Gj} e^{j(\phi_{Gj} - 2\pi f \frac{2d_{Gj}}{c} + \phi_t)}$$

where the indices D and G designate the channels receiving the right hand and left hand polarizations (still assuming that the azimuth channels receive the right hand polarization and the elevational channels the left hand polarization) and indices a and e the angular azimuth and elevation dimensions.

$a_i$ is the amplitude of the ith individual reflector;
$\phi_i$ is the phase shift introduced by the ith reflector;
$d_i$ is the radar-ith reflector distance;
$\phi_t$ is the non coherent phase component which changes from pulse to pulse;
$\Psi_1, \Psi_2, \Psi_3, \Psi_4$ are the parasite phases introduced in the four reception channels.

According to the same method as before, a product detector calculates:

$$S = \Sigma_a \cdot \Sigma_e^*$$

$$D = \Delta_a \cdot \Delta_e^*$$

Then $$[S(k+1) - S(k-1)]D^*(k) =$$

$$e^{-j(\phi_2 - \phi_1 + \phi_3 - \phi_4)} \left[ a + \sum_n b_n e^{j\phi_n} \right]$$

where the phases $\phi_n$ may be considered as random phases and where:

$$a = \sum_{i,j} [s_{a(k+1)}(\theta_{Di}) - s_{a(k-1)}(\theta_{Di})] d_{a(k)}(\theta_{Di}) s_e(\theta_{Gj}) d_e(\theta_{Gj}) a_{Di}^2 a_{Gj}^2$$

Now, the azimuth rotational speed of the radar has been chosen so that the product: $[s_{a(k+1)}(\theta_{Di}) - s_{a(k-1)}(\theta_{Di})] d_{a(k)}(\theta_{Di})$ is positive for all the elementary reflectors.

Moreover, $s_e(\theta_{Gj})$ is positive, $a^2_{Di} a^2_{Gj}$ is positive and $d_e(\theta_{Gj})$ is negative for the nearest range bins and is positive for the furthest range bins The ambiguity of sign may therefore be removed and corrected so that the factor "a" is the sum of a large number of positive real numbers Examination of several successive measurements of $[S(k+1) - S(k-1)]D^*(k)$ allows by averaging to estimate the phase correction $\Psi_1 - \Psi_2 - \Psi_3 + \Psi_4$ that is to say $\Psi_a - \Psi_e$.

The average is calculated for several range bins and several pulses so as to obtain the desired accuracy.

What is claimed is:

1. A method of processing the sum $\Sigma$ and difference $\Delta$ signals, in azimuth: $\Sigma_a$, $\Delta_a$ and in elevation: $\Sigma_e$, $\Delta_e$, of a radar of the monopulse type, for estimating the parasite phase $\Psi$ introduced between these signals by the ultrahigh frequency formation circuits of the sum and difference channels, comprising:

in calculating for each measurement made by the radar at least one case for the expressions S and D:

first case:

$$\begin{cases} S = \Sigma_a \cdot \Sigma_e \\ D = \Delta_e \cdot \Sigma_a \end{cases}$$

for estimating the azimuth parasite phase $\Psi_a$;

second case:

$$\begin{cases} S = \Sigma_e \cdot \Sigma_a \\ D = \Delta_e \cdot \Sigma_a \end{cases}$$

for estimating the elevational parasite phase $\Psi_e$;

third case:

$$\begin{cases} S = \Sigma_a \cdot \Sigma_e \\ D = \Delta_a \cdot \Sigma_e \end{cases}$$

for estimating the differential parasite phase $\delta\Psi = \Psi_a - \Psi_e$, respectively, (where the symbol * designates the complex conjugate quantity), it being understood that the radar wave emitted is polarized circularly and that the azimuth and elevation monopulse receivers receive respectively only one of the circular polarization types: right hand or left hand;

in calculating the expression $[S(k+1) - S(k-1)]D^*(k)$ it being understood that the radar antenna sweeps during time in azimuth in the first case and in the second case, in elevation in the second case and that $k-1$, $k$, $k+1$ designate three successive times such that the difference $S(k+1)(\theta) - s_{(k-1)}(\theta)$ is of the same sign as $d_{(k)}(\theta)$, where $S_{(k+1)}(\theta)$ and $s_{(k-1)}(\theta)$ respectively designate the gain of the sum channel at angle $\theta$, in azimuth in the first case and in the third case, in elevation in the second case, respectively at times $k+1$ and $k-1$, and where $d_{(k)}(\theta)$ designates the gain of the difference channel at angle $\theta$ and at time k, in the azimuth in the first and third cases, in elevation in the second case;

in calculating the mean value of the result of the preceding expression for several successive times corresponding to several measurements successively made by the radar, which allows an expression of the form $e^{j\Psi} \cdot a$ where $\Psi$ is the parasite phase sought and "a" a real number of given absolute value and sign.

2. Method as claimed in claim 1, wherein the differential parasite phase $\delta\Psi$ is estimated in a calibration phase prior to the phase of using the radar, and using an antenna sweep, and wherein the azimuth parasite phase $\Psi_a$ is then deduced, during the phase of using the radar, from the differential parasite phase $\delta\Psi$ thus estimated during the calibration phase, and from the elevational parasite phase $\Psi_e$ estimated during the phase of using the radar, without it being necessary to use antenna sweeping, by averaging the expression $\Sigma_a \cdot \Delta_a$ over several successive measurements made by the radar.

3. The method as claimed in claim 2, wherein, since only the product $[S(k+1) - S(k-1)]D^*(k)$ being of importance the expressions S and D are calculated by means of a single device used successively for calculating S and D.

4. The method as claimed in claim 1, wherein, since only the product $[S(k+1) - S(k-1)]D^*(k)$ being of importance the expressions S and D are calculated by means of a single device used successively for calculating S and D.

* * * * *